UNITED STATES PATENT OFFICE.

WILLIAM HENRY RICHARDS, OF KNOXVILLE, TENNESSEE.

SOAP COMPOUND.

SPECIFICATION forming part of Letters Patent No. 580,583, dated April 13, 1897.

Application filed September 11, 1896. Serial No. 605,532. (No specimens.)

*To all whom it may concern:*

Be it known that I, WILLIAM HENRY RICHARDS, a citizen of the United States, residing at Knoxville, in the county of Knox and State of Tennessee, have invented a certain new and useful Composition of Matter to be Used as a Substitute for Toilet and Domestic Soaps and Soap Powders and as a Metal-Polish; and I do hereby declare the following to be a full, clear, and exact description of the invention, such as will enable others skilled in the art to which it appertains to make and use the same.

Most of the soaps and soap powders used for toilet and domestic purposes, as well as compositions for polishing metal surfaces, are rendered effective by some strong alkali or sand. The action of alkalies upon the skin, whereby the natural oil is withdrawn and the skin is contracted and roughened, is well known. It is common experience that sand-soaps and soap powders in which sand is a constituent, operating mechanically, scratch and scarify. Ordinary soap also contains animal fats and oils derived from every conceivable source, which are frequently deleterious in their effects, often causing skin diseases, while the addition of rosin, clay, and other substances simply to give bulk to soap or soap powders is well known. Soap powders as a rule contain some one or all of these objectionable features and are dependent upon a strong alkali or sand for their effectiveness, while all or nearly all of them contain flour or other substance, giving them bulk and weight, but adding nothing to their usefulness.

The object of my invention is to provide a composition to be used as a substitute for toilet and domestic soaps and soap powders and for polishing metal surfaces that will be free from the objectionable features before mentioned and yet be useful and economical.

My composition consists of the following ingredients, combined in the proportions stated, namely: vegetable silica, twelve ounces; soap, four ounces. These substances are to be thoroughly commingled in any ordinary manner. In my composition the cleansing and polishing agent is vegetable silica, and its action in said composition is purely mechanical and not chemical. By means of the saponaceous ingredient in my composition a lather is formed which acts as a lubricant. The vegetable silica contained in said lather, having an affinity for dirt and grime, cleanses by contact therewith, the particles of silica triturating by friction with the skin or surface to be cleansed and enveloping themselves in the foreign matter on the surface and washing off with them. Vegetable silica is what might be termed a "refuse substance" and differs from ordinary silica in that by chemical action in the growth of the plant the silica derived therefrom is deposited in the form of a precipitate and hence is neither sharp nor gritty. It is to the kernel and stalk of grain what enamel is to the teeth, and in my composition I prefer to have it as free from starch and other nutritive substances as is possible. Vegetable silica is derived from the chaff and husks of wheat, corn, barley, rice, and other cereals when threshed and is the predominant constituent of the bran or residue left after such grain has been milled. This practically refuse material, which I prefer to have as free as possible from any of the nutritive portions of the grain, is then submitted to sufficient heat to consume the vegetable fiber, the silica being left as an ash, amorphous, but in the peculiar cellular formation in which it was originally deposited by the plant. The ash thus obtained is pulverized in the usual manner, when it is ready for use in my composition.

I have hereinbefore in part described the manner in which my composition operates as a cleansing and polishing agent, but I desire to call attention to the fact that when used as a toilet article it is not only effective in removing soil and grime, but removes the dead cuticle and polishes the skin, rendering the flesh soft and moist, while in polishing metal it burnishes quickly and brightly, but leaves no scratches, nor does it eat into the metal, as is usual when other effective compositions are used. The saponaceous substance used in my composition is preferably a neutral soap, but any form of soap or vegetable saponaceous matter may be used, as its office is simply to provide a lather to lubricate the vegetable silica.

What I claim, and desire to secure by Letters Patent of the United States, is—

1. The herein-described composition of matter, to be used for cleansing and polishing, consisting of vegetable silica and soap in the proportions specified.

2. A composition of matter, to be used for cleansing and polishing, consisting of vegetable silica and a saponaceous substance, substantially as described and in the proportions stated.

In testimony whereof I affix my signature in presence of two witnesses.

WILLIAM HENRY RICHARDS.

Witnesses:
W. C. LAWSON,
A. SIMPSON.